United States Patent [19]

Cipriani

[11] Patent Number: 5,753,988
[45] Date of Patent: May 19, 1998

[54] ELECTROMAGNETIC TORQUE COUPLING

[76] Inventor: Marco Cipriani, Via Pio VII, 84, 10135 Torino, Italy

[21] Appl. No.: 655,750

[22] Filed: May 30, 1996

[30] Foreign Application Priority Data

Jun. 2, 1995 [IT] Italy ................. TO95A0460

[51] Int. Cl.$^6$ .................. H02K 49/06; H02K 49/10; F16D 27/01
[52] U.S. Cl. .......... 310/103; 310/75 D; 310/114; 310/266; 192/84.1; 192/84.21
[58] Field of Search .................. 310/103, 114, 310/75 D, 266, 120, 115; 192/84.1, 84.21

[56] References Cited

U.S. PATENT DOCUMENTS

| | | | |
|---|---|---|---|
| 2,514,385 | 7/1950 | Garbarini | 192/84 |
| 3,394,783 | 7/1968 | Searle | 192/21.5 |
| 3,713,015 | 1/1973 | Frister et al. | 322/28 |
| 4,134,054 | 1/1979 | Akamatsu | 318/685 |
| 4,395,741 | 7/1983 | Kobayashi et al. | 360/77 |
| 4,773,518 | 9/1988 | Raad et al. | 192/84 |
| 4,814,654 | 3/1989 | Gerfast | 310/154 |
| 5,260,642 | 11/1993 | Huss | 322/51 |

FOREIGN PATENT DOCUMENTS

| | | |
|---|---|---|
| L15849 | 7/1956 | Germany . |
| 1613500 | 4/1971 | Germany . |
| 07015946 | 1/1995 | Japan . |
| 64301 | 3/1913 | Switzerland . |
| 1220145 | 1/1971 | United Kingdom . |
| 2039158 | 7/1980 | United Kingdom . |

*Primary Examiner*—Steven L. Stephan
*Assistant Examiner*—Tran N. Nguyen
*Attorney, Agent, or Firm*—Webb Ziesenheim Bruening Logsdon Orkin & Hanson, P.C.

[57] ABSTRACT

An electromagnetic torque coupling, particularly for connecting a torquing tool to a motor, for applying a predetermined torque to the tool; the joint presenting a pair of axial rotors fitted idly, coaxially in tandem, and mechanically disconnected from each other inside a casing, and respectively connected to the motor and the tool; the two rotors presenting respective opposite disk-shaped ends defined by respective opposite front faces facing each other and separated by a predetermined axial clearance, and surrounded radially on the outside by an electromagnet fitted to the casing, so that the disk-shaped ends are immersed in a predetermined magnetic field, the flux lines of which are linked via an air gap defined by the predetermined axial clearance; the front faces each presenting a respective ring of radial face teeth; the teeth in each ring presenting ridges defined by respective coplanar, flat face surfaces defined by annular wedges; and the axial clearance being defined between the surfaces of the teeth in one ring and the surfaces of the corresponding teeth in the other ring.

11 Claims, 3 Drawing Sheets

ELECTROMAGNETIC TORQUE COUPLING

BACKGROUND OF THE INVENTION

The present invention relates to an electromagnetic torque coupling, particularly for connecting a torquing tool to a motor for transmitting a predetermined torque to the tool, and is particularly suitable for use on bottling machines, for fitting screw caps to threaded-neck bottles.

In applications of the above type, mechanical torque couplings magnetic joints featuring permanent magnets are currently used. The first type presents disadvantages in terms of energy dispersion due to the use of mechanical clutches, and the devices themselves are bulky, expensive, subject to severe wear, consume large amounts of energy, and, in use, result in overheating of the caps (particularly undesirable in the case of plastic caps) and/or the formation of powder (resulting, for example, from wear of the clutches). The second type provides for noncontacting transmission between a drive rotor and a rotor connected to the torquing tool, by means of a magnetic field connecting the two rotors. When the resisting torque of the rotor connected to the torquing tool exceeds the drive torque, slippage occurs between the two rotors, which results in misalignment of their N-S poles. When, as a result of such slippage, the like poles of the two rotors are eventually positioned facing each other, kickback occurs in the opposite direction to rotation (due to repulsion of the like poles), which not only affects the cap screwing operation, but also results in severe wear of the motor and at times even in partial unscrewing of the cap.

SUMMARY OF THE INVENTION

It is an object of the present invention to overcome the aforementioned drawbacks by providing a straightforward, low-cost, reliable torque coupling for transmitting a predetermined torque to the torquing tool, while at the same time producing no kickback of the motor or tool.

According to the present invention, there is provided an electromagnetic torque coupling comprising a pair of axial rotors made of ferromagnetic material and fitted idly and mechanically disconnected from each other inside a casing, a first of said rotors being connected to and rotated by a motor, and a second of said rotors being connected to a spindle of a tool, in particular a torquing tool, to apply a predetermined torque to said tool; and at least an electromagnet for generating a predetermined electromagnetic field, respective flux lines of which are linked via said rotors wherein:

said two rotors are positioned coaxially in tandem inside said casing, and present respective facing opposite axial ends defined by respective opposite front faces separated by a predetermined axial clearance;

said facing ends of the rotors are surrounded, radially on the outside of the rotors, by said electromagnet, which is fitted integral with the casing so that said ends are immersed in said electromagnetic field, the flux lines of which are linked via a gap defined by said predetermined axial clearance between said opposite front faces of the rotors;

said front faces of the first and second rotor each presenting at least a projection and at least a corresponding cavity, which extend radially and adjacent to each other; said predetermined axial clearance being defined between respective ridges of the projections on the front faces of the first and second rotor.

More specifically, said front faces present a first and second ring of radial face teeth; the teeth in each said ring present ridges defined by respective flat face surfaces coplanar with one another and defined by annular wedges; and said axial clearance is defined between said surfaces of the teeth in the first ring and the corresponding surfaces of the teeth in the second ring. Moreover, the teeth in the first ring are identical to and equal in number to those in the second ring, and the teeth in each ring are separated laterally by respective radial cavities, the width of which, measured circumferentially, is equal to or greater than the width of the teeth.

The number of the teeth in each said ring is so selected that the width of the teeth, measured circumferentially, is never less than the sum of the maximum height, measured axially, of a cavity in the first ring and a corresponding cavity in the second ring.

As such, the flux linkage through the two rotors and the gap defined between the facing opposite front faces of the rotors is conveyed entirely through the teeth in the first and second rings, both when the teeth are perfectly matched facing one another, and when they are variously offset angularly and only face one another partially, thus enabling, when the electromagnet is energized, a predetermined torque as a function of the supply current of the electromagnet to be transmitted between the rotor connected to the motor and the rotor connected to the machine spindle. As long as the resisting torque of the second rotor is less than the drive torque, this is transmitted entirely to the second rotor, which rotates synchronously with the first, with the teeth in the first ring facing the corresponding teeth in the second ring.

As the resisting torque exceeds the drive torque, the two rotors no longer rotate synchronously, the second rotor being slowed down gradually until it eventually stops (except for the force of inertia), so that the teeth in the first ring rotate and assume a number of different angular positions in relation to those in the second. As a result, a pulsating torque is transmitted by the first rotor to the second, but in controlled manner, by virtue of its maximum value remaining constant; the minimum value, equal to zero, only being reached when each tooth in one ring corresponds exactly to a cavity in the other ring. This therefore provides for preventing any possible kickback of the second rotor, as in permanent magnet clutches, due to a temporary torque inversion, even when the second rotor is stationary, while the first continues rotating at constant speed with no stress on the motor to which it is connected. In the brief instants in which the torque is periodically zeroed by the teeth in the first ring corresponding with the cavities in the second, a variation in magnetic flux also occurs, which, with a constant supply current of the electromagnet, results in a pulsating variation, proportional to the difference in the angular speed of the two rotors, in the voltage at the terminals of the electromagnet winding/s.

This effect may, according to a further aspect of the present invention, be exploited for actively controlling the coupling. For example, the coupling may comprise means for continuously detecting the voltage at the supply terminals of the electromagnet, and supplying a pulse signal to a central control unit, which, according to one or a number of predetermined memorized programs, and on the basis of the pulse signal, provides for varying the supply current of the electromagnet to regulate the maximum torque transmittable by the coupling. In which case, the torque may be varied as required at the various stages in the torquing operation, and even be eliminated when supply to the electromagnet is cut off.

Preferably, the facing ends of the rotors are in the form of a larger-diameter circular disk, which provides for better channeling and distributing the magnetic flux, and for minimizing any residual magnetism on the facing ends of the rotors when the electromagnet is de-energized.

BRIEF DESCRIPTION OF THE DRAWINGS

A non-limiting embodiment of the present invention will be described by way of example with reference to the accompanying drawings, in which.

DETAILED DESCRIPTION OF THE INVENTION

Figure 1:
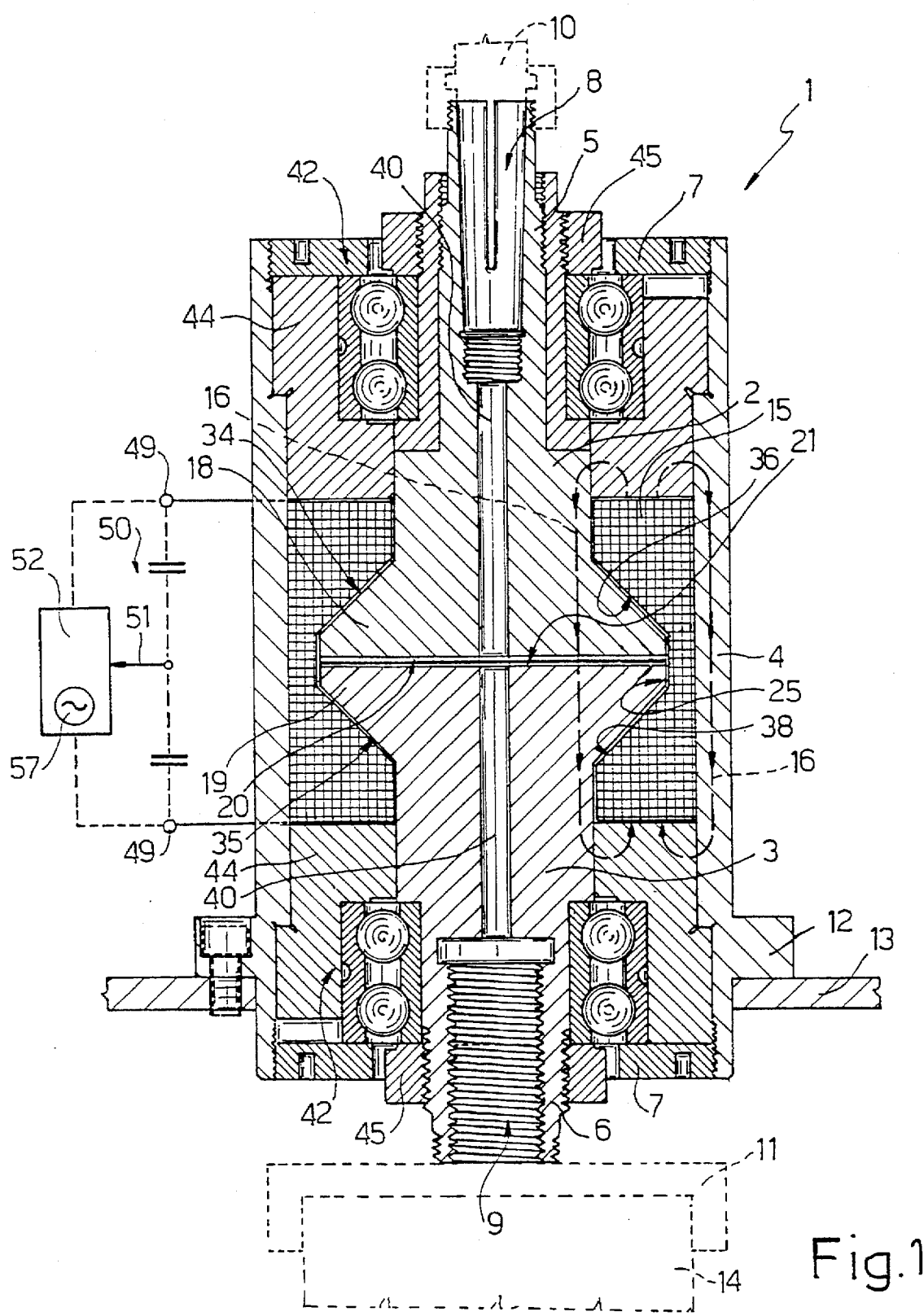
FIG. 1 shows a longitudinal section of a coupling in accordance with the present invention.

Number 1 in the accompanying drawings indicates an electromagnetic torque coupling comprising a pair of axial, substantially cylindrical rotors 2 and 3 made of ferromagnetic material and fitted idly inside a tubular, substantially cylindrical casing 4 also made of ferromagnetic material. Rotors 2 and 3 are mechanically disconnected from each other, and, at respective opposite ends 5, 6 projecting from respective opposite end covers 7 of casing 4, present respective known connecting means 8 and 9 for respectively connecting rotor 2 angularly integral with the output shaft 10 of a machine motor (not shown), and rotor 3 to a spindle 11 of the same machine. Casing 4 is in turn fitted, e.g. by means of a flange 12, to the frame 13 of said machine, which may, for example, be a known bottling machine wherein spindle 11 supports a known device 14 for torquing screw type bottle caps. As will be seen, rotor 2 may therefore be rotated by said motor to transmit a predetermined drive torque to rotor 3, while at the same time enabling rotors 2 and 3 to slide when the resisting torque applied to spindle 11 exceeds the transmitted drive torque.

In the example shown, coupling 1 comprises an electromagnet 15 in the form of a cylindrical sleeve and comprising in known manner (not shown in detail for the sake of simplicity) one or more windings with a predetermined number of turns. Electromagnet 15 provides for generating a predetermined electromagnetic field proportional to the supply current, and respective flux lines 16 of which are linked via rotors 2, 3 and casing 4.

Figure 6:
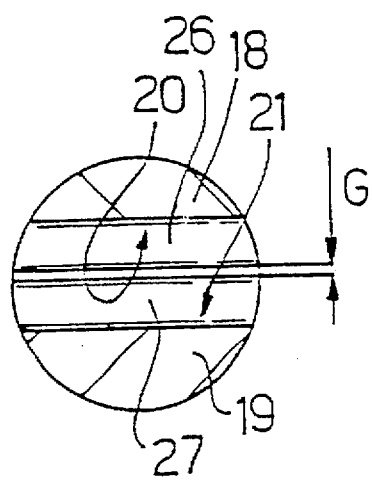
Fig. 6 shows an enlargement of a portion of the coupling shown in Fig. 1.

According to the invention, rotors 2 and 3 are positioned coaxially in tandem (i.e. end to end, one behind the other) inside casing 4, and, opposite ends 5 and 6, present respective facing opposite axial ends 18, 19 defined by respective opposite front faces 20, 21 separated by a predetermined axial clearance G. Ends 18 and 19 are preferably in the form of respective circular disk-shaped portions larger in diameter than the rest of rotors 2, 3, and are surrounded, radially on the outside of rotors 2, 3, by annular electromagnet 15, which is fitted integral with and inside casing 4, and is so formed that ends 18, 19 are fully immersed in the electromagnetic field generated by it, and flux lines 16 are linked via a gap defined by axial clearance G between faces 20 and 21 as shown in Fig. 6. For which purpose, electromagnet 15 presents an inner annular cavity 25 of an inside diameter larger than that of the rest of the winding/s forming electromagnet 15, and of such a volume as to fully house both disk-shaped ends 18, 19.

Figure 2:
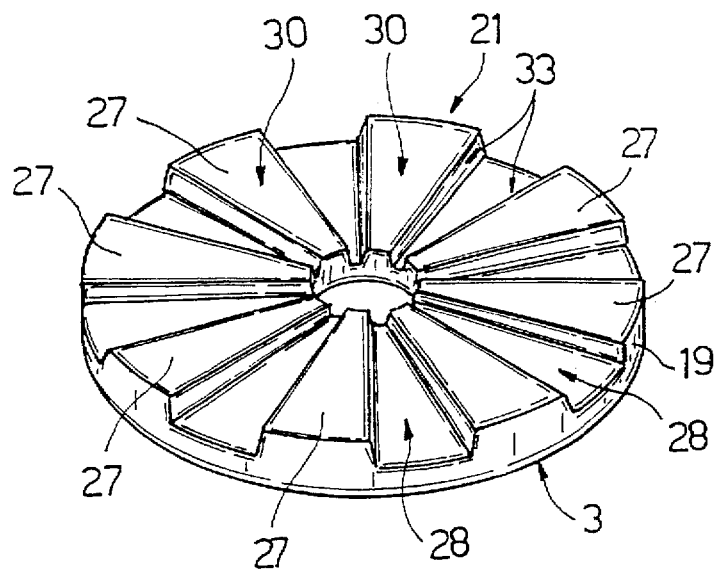
FIG. 2 shows a larger-scale view in perspective of a detail of part of the FIG. 1 coupling.

According to the present invention, faces 20 and 21 respectively present a first and second ring of radial face teeth 26 and 27 (see FIG. 2 for face 21, with which face 20 is symmetrical) so that the teeth 26 in the first ring face the teeth 27 in the second. The size, shape and number of teeth 26, 27, and the design parameters of electromagnet 15 defining the intensity of the electromagnetic field generated by it (its size, the length and diameter of the winding wires determining the maximum supply current absorbable, etc.), are so selected that, in most of the relative angular positions of teeth 26 and 27 wherein teeth 26 only partly face teeth 27 (FIGS. 3 and 4), the flux linkage between teeth 26 in the first ring and teeth 27 in the second ring is always less than or, at most, equal to the saturation flux of the ferromagnetic material of which rotors 2 and 3 are made, to prevent overheating of the rotors or electromagnet 15.

In the non-limiting example shown, teeth 26, 27 present ridges defined by respective flat face surfaces 29, 30; surfaces 29, 30 of teeth 26, 27 are all coplanar and defined by annular wedges (FIG. 2); and axial clearance G between rotors 2 and 3 is defined between surfaces 29 and 30. Preferably, teeth 26 are identical and equal in number to teeth 27, so that each tooth 26 in the first ring on rotor 2 corresponds with a tooth 27 in the second ring on rotor 3.

Figure 5:
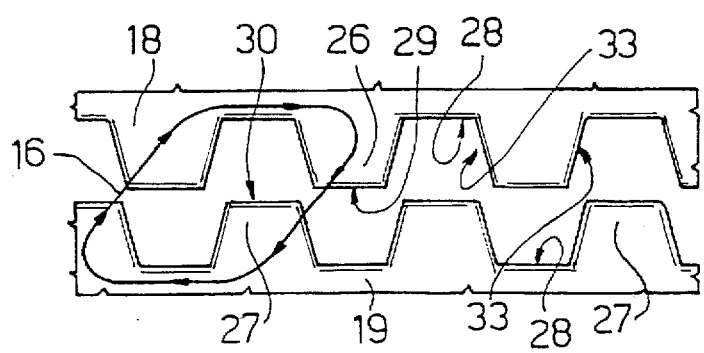

In each of the first and second rings, teeth 26, 27 are separated laterally by respective radial cavities 28, the width of which, measured circumferentially, is preferably equal to or, as shown by way of example in FIG. 5, slightly larger than the width of respective teeth 26, 27, so that, when a tooth 26 or 27 corresponds with a cavity 28 (FIG. 5), the magnetic flux is so reduced (by the increase in the air gap) that no torque is transmitted.

Figure 3:
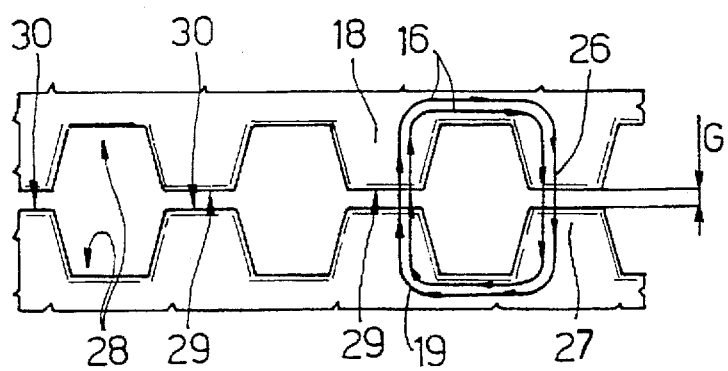
FIGS. 3, 4 and 5 show, schematically, operation of the FIG. 1 coupling.
Figure 4:
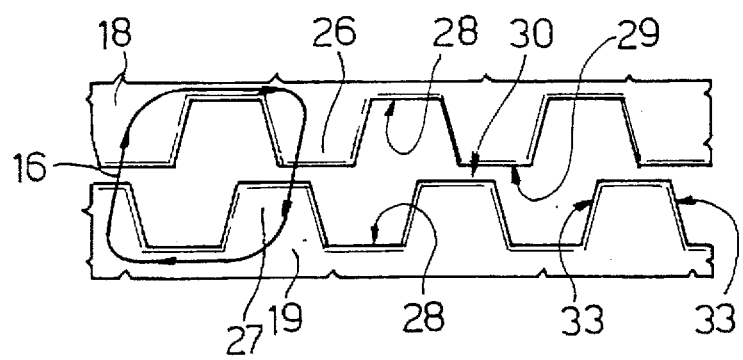

To achieve this, as well as to maintain the magnetic flux unchanged over a predetermined arc as teeth 26, 27 slide relatively (as will be seen) into only partly facing positions (FIG. 4), and to ensure full magnetic flux is restored when teeth 26, 27 slide relatively back into the partly facing position as of the FIG. 5 position, each tooth 26, 27 presents opposite sides 33 defining respective sides of adjacent radial cavities 28, and in the form of symmetrical oblique surfaces converging towards the ridge and diverging towards the base of each tooth, so that each tooth 26, 27 presents a circumferential section substantially in the form of an isosceles trapezium (FIGS. 3–5).

To further optimize distribution of flux lines 16, inner annular cavity 25 of electromagnet 15 and disk-shaped ends 18, 19 of rotors 2, 3 are defined by respective coaxial, closely facing conical lateral surfaces. More specifically, end 18 presents a conical outer lateral surface 34 tapering towards opposite end 5 and facing a first conical inner lateral surface 36 presenting the same taper and defining an upper portion of cavity 25 of electromagnet 15; end 19 presents a conical outer lateral surface 35 facing a second conical inner lateral surface 38 defining a lower portion of cavity 25 of electromagnet 15; and both surfaces 35, 38 present the same taper facing end 6 of rotor 3 and therefore opposite to the taper of surfaces 34, 36.

Rotors 2, 3 present respective through axial holes 40, and are fitted idly inside casing 4, with facing ends 18, 19 projecting inside annular electromagnet 15, by means of respective known bearings 42 fitted inside casing 4 by means of spacers 44 and locked by covers 7 and respective ring nuts 45. Bearings 42 may, of course, be assembled differently. For example, the bearing seats may be formed directly inside casing 4 (forming spacers 44 in one piece with the casing), which will therefore comprise two half shells connected by removable connecting elements (screws, bolts, etc.) to permit assembly of the bearings and the electromagnet inside the casing.

Coupling 1 may also comprise known electronic means 50 for continuously detecting the voltage at the supply terminals 49 of electromagnet 15, and supplying a pulse signal 51, proportional to the variation in voltage, to a central control unit 52, e.g. a microprocessor. This provides, according to one or a number of predetermined memorized programs, and on the basis of signal 51, for varying the supply current of electromagnet 15, e.g. by working directly on supply means 57, so as to regulate the maximum torque transmittable by coupling 1.

Coupling 1 operates as follows. When electromagnet 15 is de-energized, rotors 2 and 3 are completely disconnected and no torque or motion is transmittable between shaft 10 and spindle 11. Conversely, when electromagnet 15 is energized, a magnetic field is generated, the flux lines 16 of which permeate the whole of ends 18, 19 and are linked via clearance G defined between teeth 26 and teeth 27. In which case (FIG. 3), teeth 26 and 27 are maintained fully facing one another by the magnetic field (lowest-reluctance condition of the equivalent circuit) so that, when rotor 2 is rotated by the motor, rotor 3 is rotated synchronously with rotor 2 to rotate and supply spindle 11 with a predetermined torque M depending on the size of the air gap and the supply current of electromagnet 15.

When a resisting torque R equal to or greater than M starts to act on spindle 11, e.g. as a result of the cap being torqued coming to the end of its travel, rotor 3 is slowed down, and rotors 2 and 3 slide in relation to each other, so that teeth 26 and 27 move gradually from the FIG. 3 position (fully facing each other with rotors 2, 3 operating synchronously) to the FIG. 4 position (partially facing each other) and finally to the FIG. 5 position (teeth 26 and 27 offset and facing cavities 28), at which point they are restored cyclically to a position similar to that of FIG. 4, then to the fully facing position, and so on.

According to the present invention, as rotors 2 and 3 slide in relation to each other, the flux lines, despite becoming considerably denser at the facing portions of surfaces 29 and 30, are prevented from reaching the saturation condition over a predetermined arc in which teeth 26 and 27 are maintained largely, albeit partially, facing each other, and rotor 2 is free to continue rotating, even if rotor 3 is stationary, and to continue transmitting a constant torque to rotor 3 to complete the torquing operation. Subsequently, as the facing portions of surfaces 29, 30 get smaller and smaller as teeth 26, 27 shift towards the FIG. 5 position, the transmitted torque is rapidly zeroed as a result of the reduction in magnetic flux caused by the gradual increase in the air gap, which reduction is maximum when teeth 26, 27 are in the FIG. 5 position. Consequently, rotor 2 is free to continue rotating at constant speed without stressing the motor, while rotor 3 is stationary and receives no torque.

Finally, as rotors 2, 3 continue to rotate and teeth 26, 27 to slide in relation to each other, teeth 26, 27 are rapidly restored first to a partially facing and then to a fully facing position reproducing those in FIGS. 4 and 3, but simply offset by a given number of degrees equal to the spacing between teeth 26 (or 27). Torque transmission is therefore restored between rotors 2 and 3, and the transmitted torque increases rapidly from zero to a constant maximum substantially equal to the previous value M, while rotor 2 continues to rotate freely and rotor 3 to remain stationary.

In other words, when stationary, rotor 3 is supplied by rotor 2 with a pulsating torque of a constant maximum value substantially equal to M, and a minimum value equal to zero, but which, according to the invention, can never, under any operating condition, assume a negative value (i.e. produce a torque inversion causing rotor 3 (or 2) to rotate in the opposite direction to that imposed by the motor) as occurs with known permanent magnet clutches when the like poles are brought together. Another effect produced by the variation in magnetic flux on reaching the FIG. 4 and 5 positions is a periodic variation in voltage at terminals 49.

This therefore provides for eliminating all the drawbacks typically associated with currently used devices.

To actively control coupling 1, as opposed to "passive" or "self-control" as described above and governed by the structure of the coupling, the pulsating value of the voltage at terminals 49 may be detected by known means 50, and signal 51 supplied to central control unit 52, which may, for example:

de-energize electromagnet 15 on reaching a given set torque and/or following a predetermined angular slide (e.g. equal to two or three teeth). In this case, on reaching the end of its travel, the cap being torqued is subjected to a further number of torques equal to the maximum torque applied at the end of its travel, and equal to the number of teeth involved in said predetermined angular slide (to ensure optimum torquing of the cap), at which point coupling 1 is fully disconnected.

real-time control the torque transmitted to spindle 11 by regulating the supply current using means 57, to apply varying torques to the cap and so enhance the efficiency of the various cap torquing stages;

control or monitor the various operating parameters of the coupling (rotation speed, voltage peaks, current absorption, transmitted torque, etc.) to implement self-diagnosis functions relative to coupling 1 and/or the devices connected to it, such as the motor or spindle 11 of the machine.

The coupling according to the invention therefore not only provides for eliminating all the drawbacks of known coupling, but, for a given maximum transmitted torque, is also highly compact, particularly as compared with permanent magnet types. If size is no problem, faces 20 and 21 obviously need not necessarily present whole rings of teeth. For the coupling to operate as described, it is sufficient that faces 20, 21 do not present an entirely smooth, coplanar surface. For example, even only one tooth (or other projection) and a corresponding adjacent cavity on each face are sufficient. The maximum number of teeth in rings of teeth 26, 27, on the other hand, depends on the size (diameter) of ends 18, 19, and may be so selected that the width of each tooth 26, 27, measured circumferentially on rotors 2, 3, is always less than the sum of the height, measured at the same circumference, of the adjacent cavities 28 in the two rings.

I claim:

1. An electromagnetic torque coupling, comprising: a pair of axial rotors made of ferromagnetic material and fitted idly inside a casing, a first of said rotors being connected to and rotated by a motor, and a second of said rotors being connected to a spindle of a tool to apply a predetermined torque to said tool; and at least one electromagnet for generating a predetermined electromagnetic field, respective flux lines of which are linked via said rotors; wherein, said two rotors are positioned coaxially in tandem inside said casing and present respective facing opposite axial ends defined by respective opposite front faces separated by a predetermined axial clearance, said facing ends of the rotors are surrounded, radially on the outside of the rotors, by said at least one electromagnet, which is fitted integral with the casing so that said ends are immersed in said electromagnetic field, the flux lines of which are linked via a gap defined by said predetermined axial clearance between said opposite front faces of the rotors, said rotors are mounted in said casing such that when said at least one electromagnet is de-energized, said rotors are separated from each other and no torque is transmitted through the coupling and such that when said at least one electromagnet is energized, said rotors remain separated by the gap and are coupled by said magnetic flux lines via said predetermined axial clearance, said front faces of the first and second rotors both include at least one projection and at least one corresponding cavity, which extend radially and adjacent to each other, said predetermined axial clearance being defined between respective ridges of the projections on the front faces of the first and second rotors, and said electromagnet includes an annular cavity having an inside diameter larger than that of the rest of the electromagnet, with the facing ends of the rotors disposed inside the annular cavity.

2. An electromagnetic torque coupling comprising: a pair of axial rotors made of ferromagnetic material and fitted idly inside a casing, a first of said rotors being connected to and rotated by a motor, and a second of said rotors being connected to a spindle of a tool to apply a predetermined torque to said tool; and at least one electromagnet for generating a predetermined electromagnetic field, respective flux lines of which are linked via said rotors; wherein, said two rotors are positioned coaxially in tandem inside said casing and present respective facing opposite axial ends defined by respective opposite front faces separated by a predetermined axial clearance, said facing ends of the rotors are surrounded, radially on the outside of the rotors, by said at least one electromagnet, which is fitted integral with the casing so that said ends are immersed in said electromagnetic field, the flux lines of which are linked via a gap defined by said predetermined axial clearance between said opposite front faces of the rotors, said front faces of the first and second rotors both include at least one projection and at least one corresponding cavity, which extend radially and adjacent to each other, said predetermined axial clearance being defined between respective ridges of the projections on the front faces of the first and second rotors, and said facing opposite ends of said rotors are each in the form of a circular disk-shaped portion larger in diameter than the rest of the rotor, said at least one electromagnet being defined by at least one substantially cylindrical annular winding, inside which is defined an annular cavity having an inside diameter larger than that of the rest of the at least one winding, said facing disk-shaped ends of the rotors being housed inside said annular cavity of the at least one electromagnet.

3. An electromagnetic torque coupling as claimed in claim 2, wherein said front faces present a first and second ring of radial face teeth.

4. An electromagnetic torque coupling as claimed in claim 3, wherein the teeth in each said ring present ridges defined by respective flat face surfaces coplanar with one another and defined by annular wedges, said axial clearance being defined between said surfaces of the teeth in the first ring and the corresponding surfaces of the teeth in the second ring.

5. An electromagnetic torque coupling as claimed in claim 4, wherein the teeth in the first ring are identical to and equal in number to those in the second ring.

6. An electromagnetic torque coupling as claimed in claim 5, wherein said teeth in each said ring are separated laterally by respective radial cavities, the width of which, measured circumferentially, is equal to or greater than the width of said teeth in the same ring.

7. An electromagnetic torque coupling as claimed in claim 6, wherein each tooth presents opposite sides defining respective sides of adjacent said radial cavities, and in the form of symmetrical oblique surfaces converging towards the ridge and diverging towards the base of the tooth, so that each tooth presents a circumferential section substantially in the form of an isosceles trapezium.

8. An electromagnetic torque coupling as claimed in claim 6, wherein the number of teeth in each said ring is so selected that the width of a tooth, measured circumferentially, is never less than the sum of the maximum height, measured at the same circumference, of an adjacent cavity in the first ring and a corresponding adjacent cavity in the second ring.

9. An electromagnetic torque coupling as claimed in claim 2, wherein said inner annular cavity of the at least one electromagnet and said disk-shaped ends of the two rotors are defined by respective coaxial, closely facing conical lateral surfaces, the disk-shaped end of the first rotor presenting a conical outer lateral surface tapering towards the opposite end of the first rotor and facing a first conical inner lateral surface presenting the same taper and defining an upper portion of said annular cavity of the electromagnet; and the corresponding end of the second rotor presenting a conical outer lateral surface facing a second conical inner lateral surface defining a lower portion of said annular cavity of the at least one electromagnet, said lateral surfaces presenting an opposite taper to that of the lateral surface of the disk-shaped end of the first rotor.

10. An electromagnetic torque coupling as claimed in claim 2, wherein said rotors present respective through axial holes, and are fitted idly inside said casing with said facing ends projecting inside said electromagnet; said casing also being made of ferromagnetic material.

11. An electromagnetic torque coupling as claimed in claim 2, comprising means for continuously detecting the voltage at the supply terminals of the at least one electromagnet, and supplying a pulse signal, proportional to the variation in voltage, to a central control unit, which, according to at least one predetermined memorized program, and on the basis of said pulse signal, provides for varying the supply current of the at least one electromagnet so as to regulate the maximum torque transmittable by the coupling.

* * * * *